(12) United States Patent
Sandgren et al.

(10) Patent No.: US 6,280,266 B1
(45) Date of Patent: Aug. 28, 2001

(54) AMPHIBIOUS VEHICLE DRIVETRAIN

(75) Inventors: Douglas Krister Sandgren, Nixa; Ronald E. Bollinger, Reed Springs, both of MO (US)

(73) Assignee: Ozarks Scenic Tours, Inc., Branson, MO (US)

( * ) Notice: Subject to any disclaimer, the term of this patent is extended or adjusted under 35 U.S.C. 154(b) by 0 days.

(21) Appl. No.: 09/384,909

(22) Filed: Aug. 27, 1999

(51) Int. Cl.⁷ ........................................ B60F 3/00
(52) U.S. Cl. ............................................. 440/12.5
(58) Field of Search .............. 440/12.5, 83; 180/374, 180/383

(56) References Cited

U.S. PATENT DOCUMENTS

| | | | |
|---|---|---|---|
| 2,839,902 | * | 6/1958 | Glover .................................... 464/23 |
| 3,064,746 | * | 11/1962 | Williamson .......................... 180/54.1 |
| 3,614,989 | * | 10/1971 | Bott et al. .............................. 180/246 |
| 3,865,205 | * | 2/1975 | Swanson ................................ 180/12 |
| 3,995,513 | * | 12/1976 | Amdall et al. .......................... 74/574 |
| 4,206,661 | * | 6/1980 | Horstmann et al. ............... 74/606 R |
| 4,257,505 | * | 3/1981 | Stodt .................................. 192/18 A |
| 4,925,409 | * | 5/1990 | Johnson .................................. 440/52 |
| 4,938,723 | * | 7/1990 | Yoshimura et al. .................... 440/52 |
| 5,203,740 | * | 4/1993 | Okuzumi et al. ....................... 464/89 |
| 5,306,093 | * | 4/1994 | Elbert .................................... 403/259 |
| 5,469,931 | * | 11/1995 | Kawata et al. ........................ 180/379 |
| 5,564,518 | * | 10/1996 | Ishii et al. ............................. 180/242 |
| 5,752,862 | * | 5/1998 | Mohler et al. .......................... 440/38 |
| 5,868,093 | * | 2/1999 | Tseng .................................. 440/12.5 |
| 5,988,092 | * | 11/1999 | Price .................................... 114/162 |

OTHER PUBLICATIONS

"Principles of Automotive Vehicles", Departments of the Army and the Air Force, Jan. 1956, pp 331–333.

* cited by examiner

Primary Examiner—S. Joseph Morano
Assistant Examiner—Andrew Wright
(74) Attorney, Agent, or Firm—Shook, Hardy & Bacon LLP

(57) ABSTRACT

A drivetrain for an amphibious vehicle for spacing a transmission apart from a motor to permit the relative positions of the motor and the transmission in the vehicle to be lowered. The drivetrain includes a separator shaft with first and second U-joints attached at its ends, an adaptor plate for coupling one of the U-joints to a motor flywheel, an adaptor hub, an adaptor shaft and a coupler. The drivetrain transfers rotational movement from the motor to the spaced-apart transmission.

19 Claims, 3 Drawing Sheets

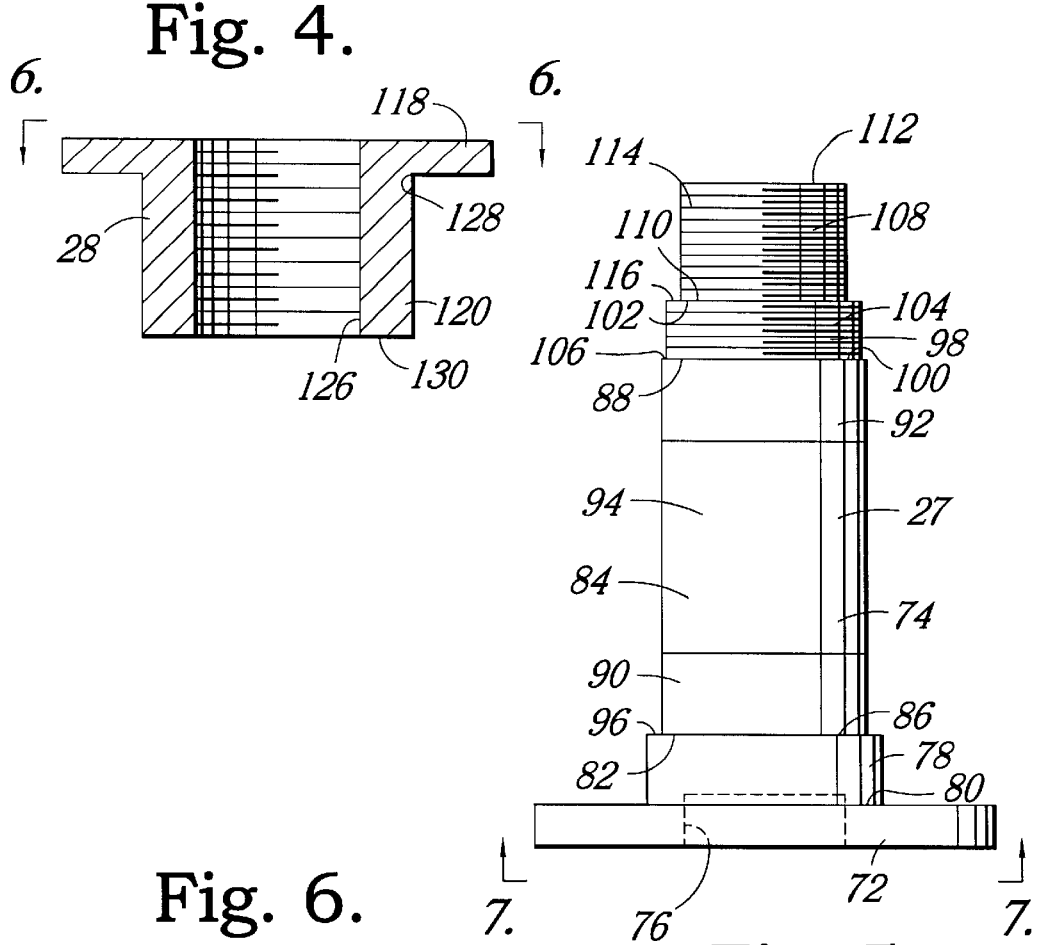
Fig. 4.
Fig. 5.
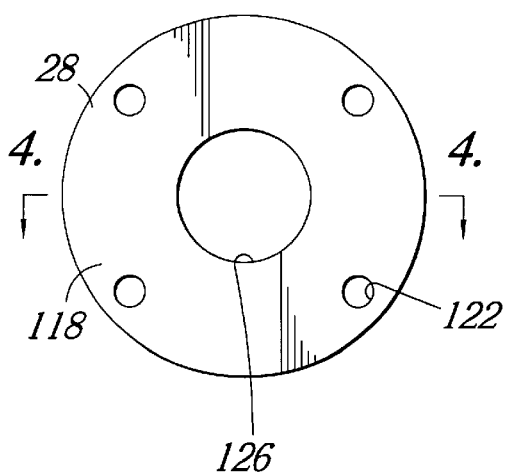
Fig. 6.
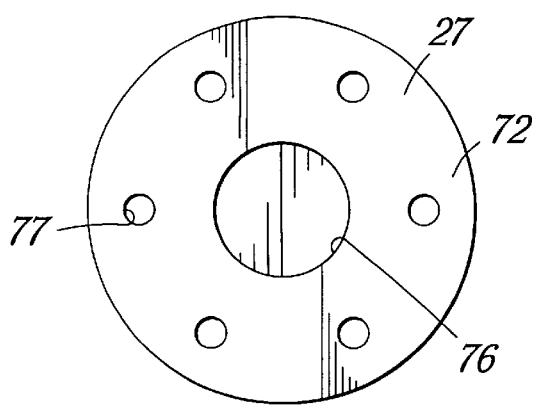
Fig. 7.

AMPHIBIOUS VEHICLE DRIVETRAIN

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a drivetrain for an amphibious vehicle and, more particularly, to a drivetrain which is located between a motor and a transmission such that the transmission may be spaced apart from the motor.

Amphibious vehicles present unique design challenges. Unlike cars and trucks which are designed specifically to be driven on the land and boats which are designed specifically to be driven on water, amphibious vehicles must be designed to handle both tasks equally well. When driven on land, the body of an amphibious vehicle must ride high enough off the ground to clear standard obstacles faced by all road vehicles. On the other hand, when the amphibious vehicle is driven in water, the vehicle must sit low enough in the water to be stable. The stability of the vehicle in water is increased as it's center of gravity is lowered.

One way to lower the center of gravity of the vehicle is to lower the relative positions of the mechanical items that drive the amphibious vehicle. One of the heaviest mechanical items in an amphibious vehicle is the motor. Another item which is substantially heavy is the transmission, which is connected to the motor. Consequently, it would be beneficial to lower the position of the motor and the transmission in the body of the vehicle.

In general, motors in amphibious vehicles are mounted in a front portion of the body or hull, as is common in cars and trucks. This arrangement allows for more room in the body of the vehicle for passengers and cargo than in situations where the engine is mounted towards the middle or rear of the amphibious vehicle. A drawback of this arrangement, however, is the configuration of the hull or body of the vehicle. As the underneath of the body must be watertight and solid to allow the amphibious vehicle to float, the bottom of the body or the hull must be designed to conform to the parts of the vehicle which must remain outside of the hull to allow the vehicle to move on land. In other words, the wheels and the axles of the vehicle must be located on the outside of the water tight body. So that the entire body does not have to be above the wheels, which would result in a vehicle with a extremely high center of gravity, contours are provided in the underneath side of the hull that permit the body to be lowered around and partially encompass portions of the wheels and axles.

One of the contours that is provided in the underneath side of the body is a channel which partially encompasses the front axle. This channel, like the axle it surrounds, is perpendicular to the longitudinal axis of the body and is located in a front portion of the vehicle. The motor and transmission combination is generally parallel to the longitude axis of the vehicle as a drive shaft extends from the transmission to the rear axle of the vehicle to supply the rear wheels with power. As the front axle channel protrudes up into the cavity in the front portion of the body where the motor and transmission sit, it presents a barrier to being able to lower the motor and transmission in the hull to lower the vehicle's center of gravity and increase it's stability.

Therefore, there is a need for a method of lowering the relative positions of the motor and the transmission in an amphibious vehicle while maintaining the presence of a axle channel in the front of the vehicle's hull. The present invention overcomes the drawbacks of the prior art and fills these and other needs.

BRIEF SUMMARY OF THE INVENTION

It is a general object of the present invention to lower the center of gravity in an amphibious vehicle, thereby increasing it's stability when driven in water.

It is an object of the present invention to increase the room available for people and cargo in the hull of an amphibious vehicle by lowering the relative position of the transmission.

Another object of the present invention is to provide a drivetrain that allows the transmission of a vehicle to be spaced apart from the motor.

A further object of the invention is to provide a drivetrain capable of transferring rotational motion from a motor to a transmission.

In order to overcome the above-stated problems and limitations, and to achieve the noted objects, there is provided a drivetrain having a separator shaft with first and second ends. The separator shaft is preferably connected to the motor on its first end by a first universal joint ("U-joint") and an adaptor plate. The separator shaft is preferably connected to the transmission on its second end by a second U-joint, a coupler, an adaptor hub and an adaptor shaft.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWING

The objects and features of the invention noted above are explained in more detail with reference to the preferred embodiments illustrated in the attached drawing figures, in which like reference numerals denote like elements, and in which:

FIG. 4 is a cutaway side view of the coupler of the drivetrain taken along line 4—4 of FIG. 6;

FIG. 5 is a side view of the adaptor shaft of the drivetrain;

FIG. 6 is an end view of the coupler of the drivetrain in the direction of line 6—6 of FIG. 4; and FIG. 7 is an end view of the adaptor shaft of the drivetrain in the direction of line 7—7 of FIG. 5.

DETAILED DESCRIPTION OF THE INVENTION

Figure 1:
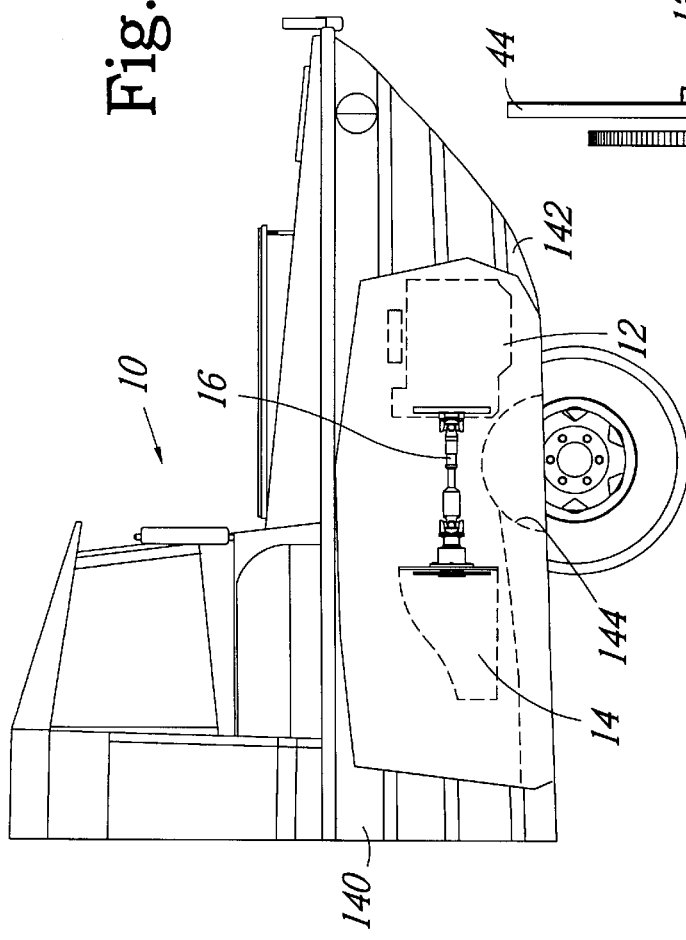
FIG. 1 is a side view of an amphibious vehicle having a portion thereof cut-away to show the drivetrain of the present invention.

Referring now to the drawings in more detail and initially to FIG. 1, numeral 10 generally designates an amphibious vehicle. The amphibious vehicle 10 has a motor 12 and a transmission 14 which are separated by and connected to each other by a drivetrain 16 of the present invention.

Figure 2:
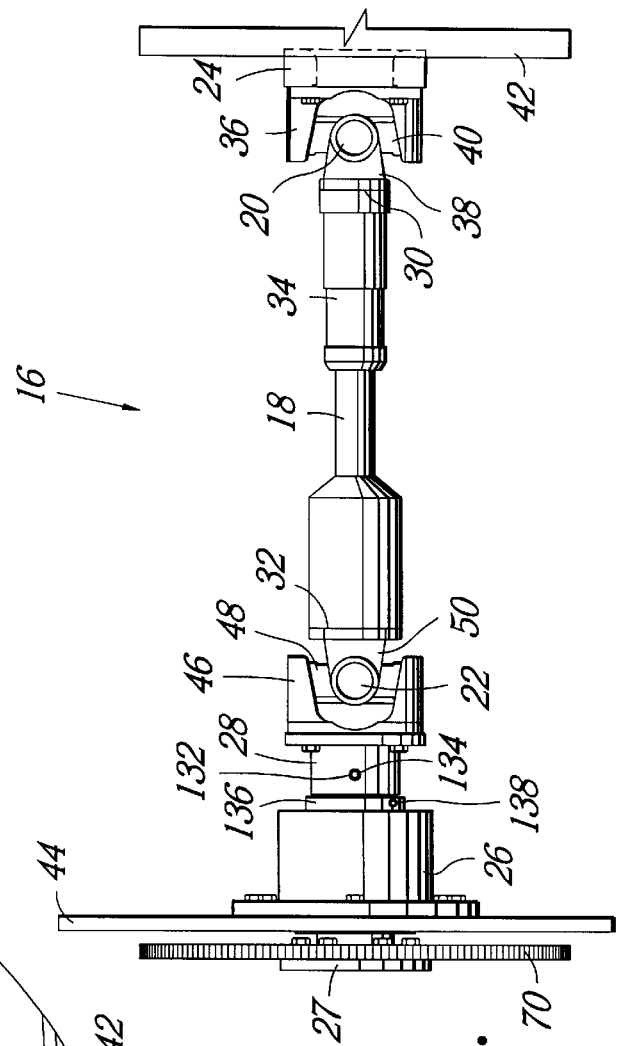
FIG. 2 is a side view of drivetrain of the present invention.
Figure 3:
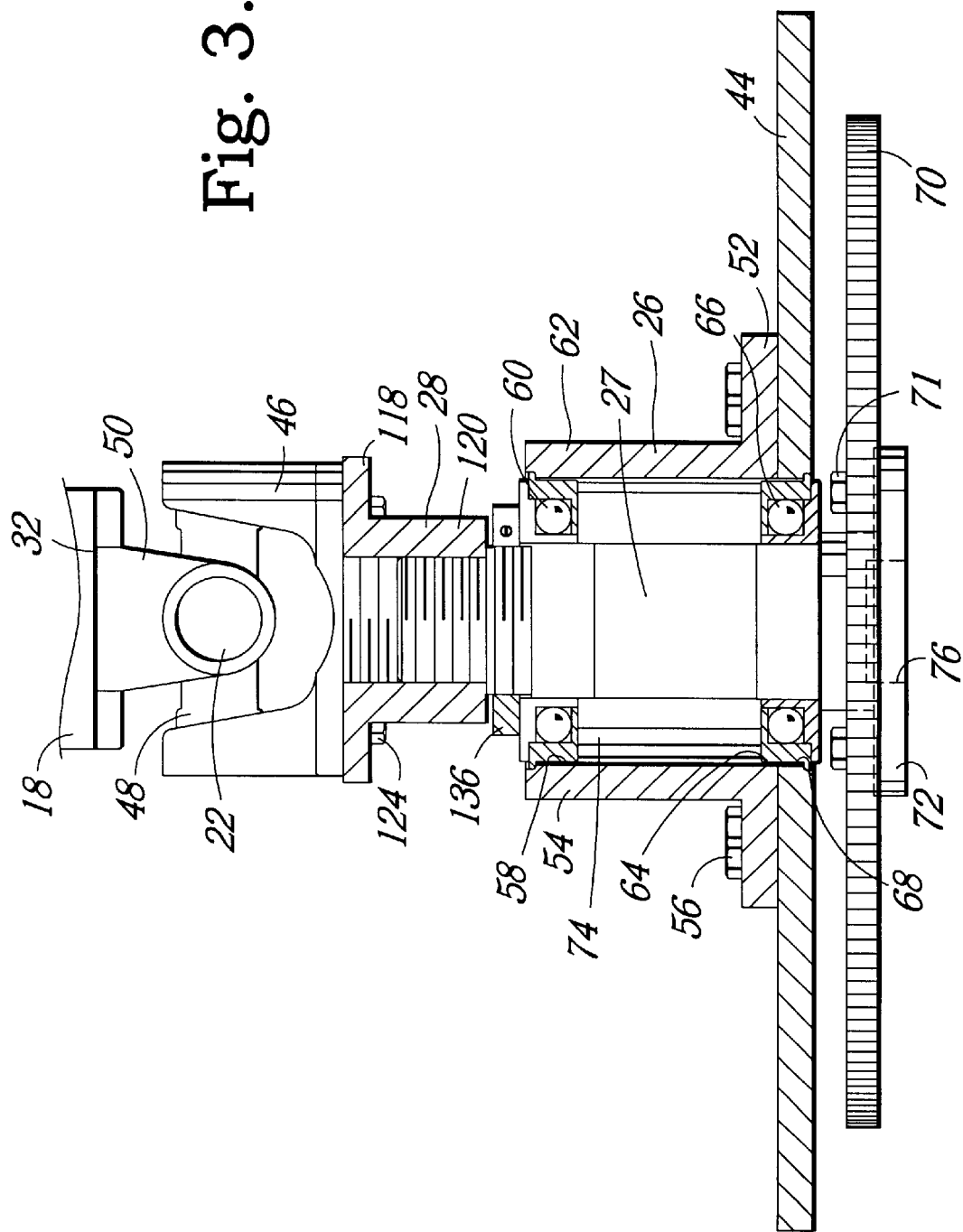
FIG. 3 is a side view of a portion of the drivetrain of the present invention adjacent the transmission with portions thereof cut away.

Looking now at FIG. 2, in general, the drivetrain 16 includes a separator shaft 18 and preferably also includes a first U-joint 20, a second U-joint 22, an adaptor plate 24, an adaptor hub 26, an adaptor shaft 27 and a coupler 28. The shaft 18 has a first end 30 and a second end 32. The shaft also has a slip joint 34 to permit the shaft 18 to be lengthened and shortened as needed during rotation.

The first end 30 of the shaft 18 is coupled with the motor 12 preferably by the use of the first U-joint 20. The first U-joint is of common construction and includes a flange yoke 36 and a sliding yoke 38. The two yokes 36, 38 are connected by a journal 40.

In the prior art, the motor 12 has a crankshaft which is bolted directly to a flywheel in the transmission. In the present situation, however, the motor 12 has a motor flywheel 42. The motor flywheel 42 is coupled with the flange yoke 36 of the first U-joint 20 by way of the adaptor plate 24.

The second U-joint 22 is preferably coupled with the second end 32 of the shaft 18. Like the first U-joint 20, the second U-joint 22 includes a flange yoke 46 and a journal 48. The second U-joint 22, however, has a fixed yoke 50 instead of a sliding yoke like the sliding yoke 38 found in the first U-joint 20 as a second sliding yoke is not necessary. It should be noted at this time that while the first U-joint 20 having the sliding yoke 38 has been placed at the first end 30 of the shaft 18, the shaft could be flipped end for end or the U-joints 20, 22 could be reversed.

The adaptor hub 26 is preferably bolted directly to a transmission cover plate 44 has a disk 52 and a body 54. The disk 52 is coupled with the transmission cover plate 44 via bolts 56. The body 54 has a first seat 58 for receiving a first set of bearings 60 at a distal end 62 of the hub 26. The hub 26 also has a second seat 64 for receiving a second set of bearings 66 located at least partially in the disk 52. The transmission cover plate 44 includes a through bore 68 which cooperates with the second seat 64 of the adaptor hub to retain the second set of bearings 66.

The transmission 14 has a transmission flywheel 70 which is generally bolted directly to the crank shaft of the motor 12. In the present invention, however, the transmission flywheel 70 is bolted to the adaptor shaft 27 with bolts 71. The adaptor shaft 27 has a base 72 and a rod member 74 which extends generally perpendicular to the base 72. The base 72 contains a recess 76 for use as a centering port for a torque convertor in the transmission 14 and a plurality of bolt holes 77 for receiving the bolts 71. The rod member 74 preferably has four sections of differing diameters. The first section 78 of the rod member 74 abuts the base 72 at a proximal end 80. The proximal end 80 of the first section also includes a portion of the recess 76. The first section has a distal end 82 opposite the proximal end 80.

The rod member 74 has a second section 84 with a proximal end 86 and a distal end 88. The proximal end 86 of the second section 84 abuts the distal end 82 of the first section. The second section 84 also includes a proximal bearing portion 90, a distal bearing portion 92 and an intermediate portion 94. The proximal bearing portion 90 is sized to receive the second set of bearings 66 and the distal bearing portion 92 is sized to receive the first set of bearings 60. While the diameter of the intermediate portion may be slightly less than the diameters of the proximal bearing portion 90 and the distal bearing portion 92, the diameter of the second section 84 is less than the diameter of the first section 78. This step down in diameter from the first section 78 to the second section 84 presents a first shoulder 96. This first shoulder 96 presents a surface upon which the second set of bearings 66 may rest.

The rod member 74 has a third section 98 with a proximal end 100 and a distal end 102. The proximal end 100 of the third section 98 abuts the distal end 88 of the second section 84. The third section 98 has a treaded surface 104. The diameter of the third section 98 is less than the diameter of the second section 84 and thus presents a second step down in diameter of the rod member 74 and a second shoulder 106.

The rod member 74 has a fourth section 108 which has a proximal end 110 and a distal end 112. The proximal end 110 of the fourth section 108 abuts the distal end 102 of the third section 98. The fourth section also preferably presents a threaded surface 114 and has a diameter which is less than the diameter of the third section 98. Consequently, the smaller diameter of the fourth section presents a third step down in diameter for the rod member 74 and presents a third shoulder 116.

The coupler 28 has a base 118 and a body 120. The base 118 preferably has four bolt holes 122 to allow the coupler 28 to be bolted to the flange yoke 46 of the second U-joint 22 via bolts 124. The coupler 28 includes a through bore 126 along a longitudinal axis of the coupler 28. The through bore 126 is internally threaded such that the coupler 28 may threadably receive the threaded surface 114 of the fourth section 108 of the adaptor shaft 27.

The body 120 of the coupler 28 preferably has a proximal end 128 and a distal end 130. The proximal end 128 abuts the base 118 while the distal end 130 abuts the third shoulder 116 of the adaptor shaft 27 when the adaptor shaft 27 is threadably received in the coupler 28. It should be noted that the threads of the fourth section 108 of the adaptor shaft 27 and the threads of the through bore 126 in the coupler 28 should be arranged such that the rotary motion imparted on the separator shaft 18 by the motor 12 is in a direction that would continue to screw the coupler 28 onto the adaptor shaft 27. In other words, if the coupler 28 must rotate in a clockwise direction to screw onto the adaptor shaft 27, the separator shaft 18 must also rotate a clockwise direction. Otherwise, the rotary motion of the separator shaft 18 will attempt to unscrew the coupler 28 from the adaptor shaft 27 during use of the motor 12. While the rotational motion of the shaft 18 in the same rotational direction required to screw the coupler 28 on to the adaptor shaft 27 works to make sure that the distal end 130 of the body 120 of the coupler 28 stays in contact with the third shoulder 116 of the adaptor shaft 27, the body 120 of the coupler 28 preferably also includes a bore 132 for receiving a set screw 134. The set screw 134 helps to lock the coupler 28 onto the fourth section 108 of the adaptor shaft 27.

The drivetrain 16 also includes a locking nut 136. The locking nut 136 is threadably received on the third section 98 of the adaptor shaft 27 and is used to hold the first set of bearings 60 in the first seat 58 of the adaptor hub 26. The locking nut 136, by being threadably received on the adaptor shaft 27, can be used to adjust the compression pressure applied to the first and second sets of bearings 60, 66. The locking nut 136 preferably includes a set screw 138 which may be tightened once the locking nut has been screwed down far enough to present the desired compression pressure on the first and second sets of bearings 60, 66 to cinch the locking nut 136 onto the adaptor shaft 27 to secure the locking nut 136 in position.

The amphibious vehicle 10 has a body 140 with a bottom portion or hull 142. The hull 142 has a channel 144 therein to accommodate a front axle of the vehicle 110. By inserting the drivetrain 16 between the motor 12 and the transmission 14, the relative positions of the motor 12 and the transmission 14 in the body 140 of the vehicle 10 may be lowered as the motor 12 may be moved forwardly of the channel 140 and the transmission 14 may be moved rearwardly of the channel 144. The drivetrain 16, in turn, spans between the motor 12 and the transmission 14 over the channel 144.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An amphibious vehicle having a novel drivetrain which facilitates lowering the amphibious vehicle's center of gravity, the vehicle comprising:

an amphibious vehicle body having a longitudinal axis and forward and rearward ends, the body further having a hull with a channel therein adjacent the forward end of the body, the channel being transverse the longitudinal axis of the body;

a motor positioned within the body forward of the channel;

a transmission positioned within the body rearward of the channel, wherein at least a portion of the channel is intermediate the motor and the transmission; and a drivetrain with a separator shaft having a first end coupled with the motor and a second end coupled with the transmission, wherein the motor is spaced apart from the transmission by the separator shaft, and wherein at least a portion of the separator shaft crosses over the channel.

2. The vehicle of claim 1, wherein the drivetrain further includes a first U-joint and a second U-joint, wherein the first end of the separator shaft is couple with the motor via the first U-joint and wherein the second end of the separator shaft is coupled with the transmission via the second U-joint.

3. The vehicle of claim 2, wherein the drivetrain further includes an adaptor plate and wherein the first U-joint is coupled with the motor via the adaptor plate.

4. The vehicle of claim 3, wherein the motor has a flywheel and wherein the adaptor plate is coupled with the flywheel of the motor.

5. The vehicle of claim 3, wherein the drivetrain further includes a coupler and wherein the second U-joint is coupled with the transmission via the coupler.

6. The vehicle of claim 5, wherein the drivetrain further includes an adaptor shaft and wherein the coupler is coupled with the transmission via the adaptor shaft.

7. The vehicle of claim 6, wherein the coupler has a bore and wherein the bore is internally threaded.

8. The vehicle of claim 7, wherein the adaptor shaft has a protruding rod member and wherein the rod member is externally threaded and sized for threaded engagement with the internally threaded bore of the coupler.

9. The vehicle of claim 8, wherein the drivetrain further includes an adaptor hub and wherein the adaptor hub receives and supports the adaptor shaft.

10. The vehicle of claim 9, wherein the adaptor hub supports the adaptor shaft with bearings.

11. A method of lowering a center of gravity of an amphibious vehicle, the steps comprising:

obtaining an amphibious vehicle having a body, a motor and a transmission, wherein the body has a hull with a bottom surface and wherein the bottom surface has an axle channel therein that is transverse the body;

obtaining a separator shaft having first and second ends;

spacing the motor apart from the transmission;

connecting the motor to the transmission via the separator shaft; and positioning the motor, separator shaft and transmission in the body of the vehicle, wherein the motor is positioned in the body forward of the channel, wherein the transmission is positioned in the body rearward of the channel, wherein the separator shaft is transverse the channel, and wherein at least a portion of the channel is between the motor and the transmission, thereby permitting the motor and transmission to be lowered in the vehicle.

12. The method of claim 11, further including:

obtaining first and second U-joints;

coupling the first end of the separator shaft to the motor via the first U-joint; and coupling the second end of the separator shaft to the transmission via the second U-joint.

13. An amphibious vehicle having a lowered center of gravity, the vehicle comprising:

a vehicle body having a bottom surface with a transverse channel therein for receiving a portion of a front axle of the vehicle;

a motor positioned in said body forwardly of the channel;

a transmission spaced apart from said motor and positioned in the body rearwardly of the channel; and a separator shaft positioned between the motor and the transmission, wherein the motor is coupled to the transmission via the shaft, and wherein at least a portion of the channel is located between the motor and the transmission, whereby the motor and the transmission may be lowered on opposite sides of the channel to lower the center of gravity of the vehicle and thereby increase the vehicle's stability.

14. The vehicle of claim 13, wherein the body has a longitudinal axis and a bottom portion, the bottom portion having a channel therein, the channel being transverse the longitudinal axis of the body, and wherein the motor is located on one side of the channel and the transmission is located on another side of the channel opposite the motor.

15. The vehicle of claim 14, wherein the shaft extends over the channel from the motor to the transmission.

16. The vehicle of claim 13, wherein the shaft has a first end and a second end, the vehicle further including:

a first U-joint coupling said first end of said shaft to said motor; and a second U-joint coupling said second end of said shaft to said transmission.

17. The vehicle of claim 16, further including an adaptor plate and wherein the first U-joint is coupled to the motor via the adaptor plate.

18. The vehicle of claim 17, further including an adaptor shaft and wherein the second U-joint is coupled to the transmission via the adaptor shaft.

19. The vehicle of claim 18, further including a coupler having an internally threaded bore, wherein the adaptor shaft has an externally threaded protruding rod member, and wherein the rod member is sized for threaded engagement with the internally threaded bore of the coupler.

* * * * *